G. W. NÜTZ.
LUBRICATOR.
APPLICATION FILED MAR. 30, 1908.

920,629.

Patented May 4, 1909.
3 SHEETS—SHEET 1.

Witnesses
Harry L. Smith
Hamilton D. Turner

Inventor
George W. Nütz
by his Attorneys
Smith & Brazier

G. W. NÜTZ.
LUBRICATOR.
APPLICATION FILED MAR. 30, 1908.
920,629.
Patented May 4, 1909.
3 SHEETS—SHEET 2.
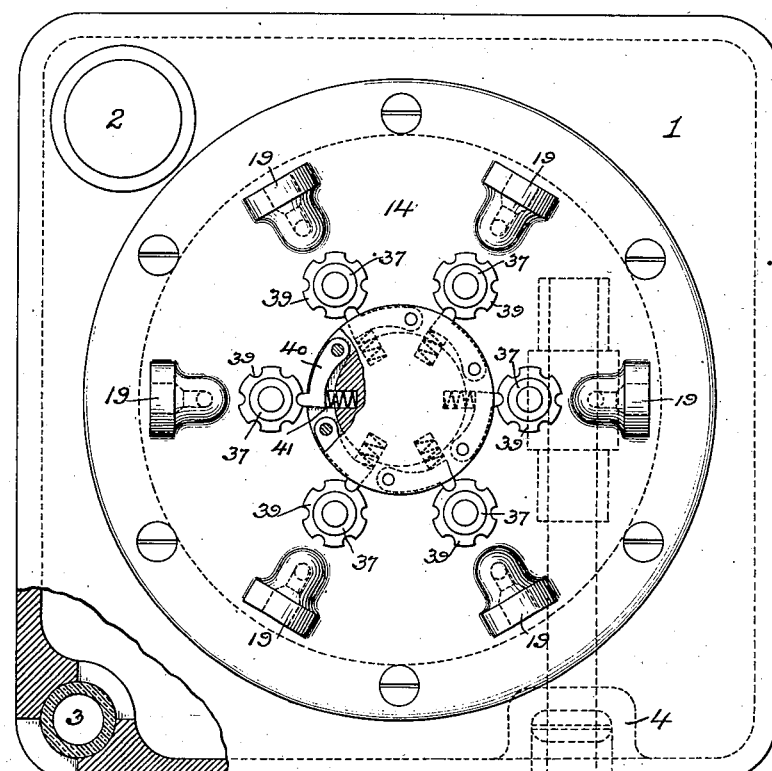
Fig. 3.
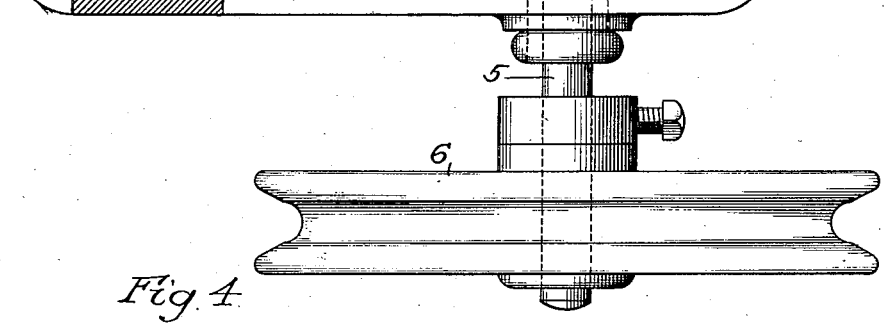
Fig. 4.
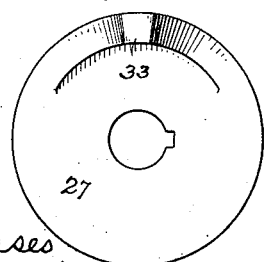
Fig. 5.
Fig. 6.
Witnesses
Harry L. Smith
Hamilton D. Turner
Inventor
George W. Nütz
by his attorneys
Smith & Frazier

G. W. NÜTZ.
LUBRICATOR.
APPLICATION FILED MAR. 30, 1908.

920,629.

Patented May 4, 1909.
3 SHEETS—SHEET 3.

UNITED STATES PATENT OFFICE.

GEORGE W. NÜTZ, OF BROOKLYN, NEW YORK.

LUBRICATOR.

No. 920,629.  Specification of Letters Patent.  Patented May 4, 1909.

Application filed March 30, 1908. Serial No. 424,180.

*To all whom it may concern:*

Be it known that I, GEORGE W. NÜTZ, a citizen of the United States, residing in Brooklyn, New York, have invented certain Improvements in Lubricators, of which the following is a specification.

My invention relates to that type of lubricators in which the reservoir for the lubricant contains a plurality of pumps, each communicating, through suitable pipe connections, with one of the bearings or other elements of the machine to be lubricated, these pumps being actuated successively by suitable cam mechanism carried by a rotating shaft.

The objects of my invention are to render unnecessary the employment of an individual check valve or plurality of valves for each pump; to lessen side thrust upon the pump plungers, due to the action of the lifting cam thereon; to relieve the cam-operating shaft and cam from the strains exerted thereupon when the cam is rigidly mounted upon the shaft; to prevent injury to any of the operative parts of the device in the event of the discharge from any one or more of the pumps being obstructed from any cause, and to provide for readily varying, at will, the amount of lubricant delivered by any of the pumps, and generally to provide a simple, compact, and efficient mechanism whose working parts are not liable to derangement but are readily accessible when access thereto is desired. These objects I attain in the manner hereinafter set forth, reference being had to the accompanying drawings, in which—

Figure 1:
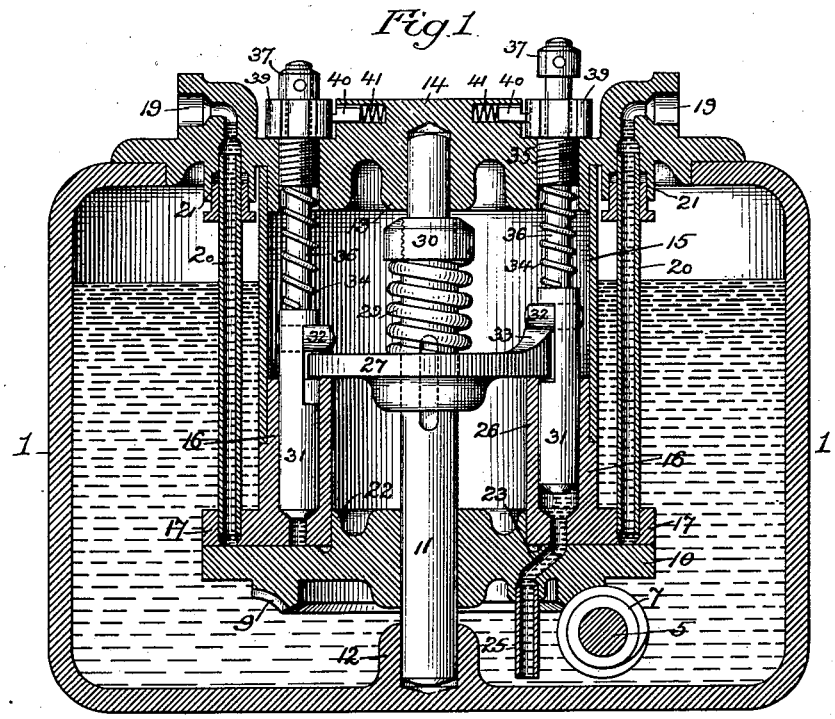
Figure 2:
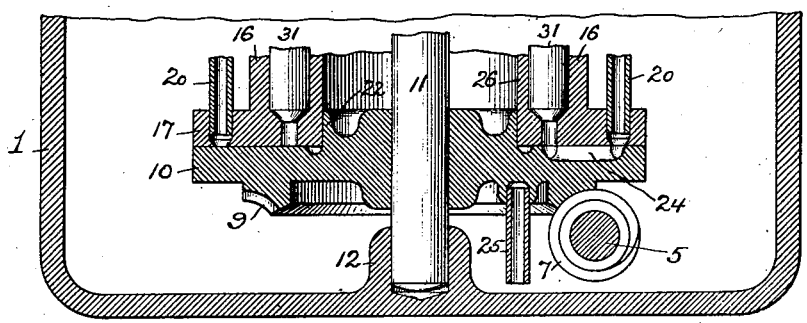
Figure 7:
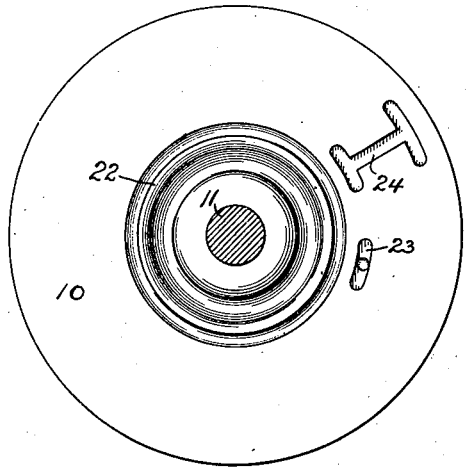
Figure 8:
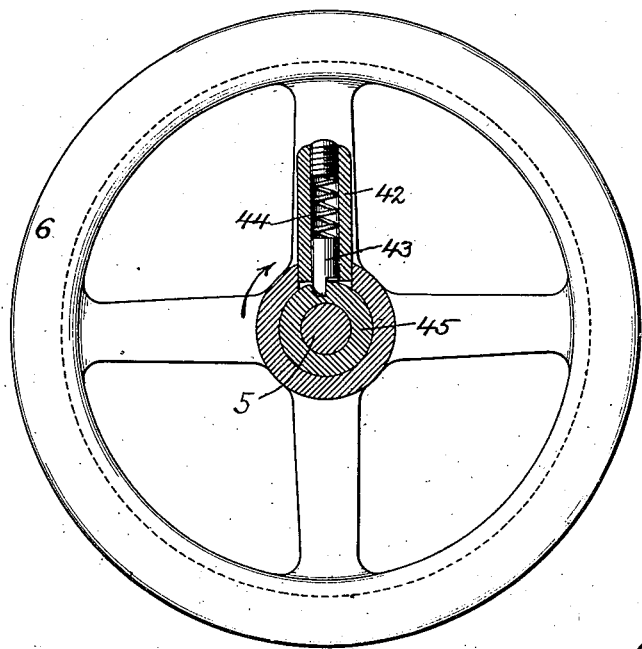

Figure 1 is a transverse vertical section of a lubricating device constructed in accordance with my invention; Fig. 2 is a sectional view of certain parts of the same, showing one of said parts in a different relation to the others from that represented in Fig. 1; Fig. 3 is a plan or top view of the device with certain parts of the same shown in horizontal section; Fig. 4 is a plan or top view of the cam member of the device; Fig. 5 is a transverse vertical section of the same; Fig. 6 is a view similar to Fig. 5 but showing a different cam formation which is sometimes employed; Fig. 7 is a plan or top view of a valve disk constituting an element of the device, and Fig. 8 is a transverse sectional view illustrating means for coupling the driving wheel to the operating shaft of the lubricator when a cam formation similar to that shown in Fig. 6 is employed.

In the drawings, 1 represents the casing of the lubricator which may be of any desirable shape, dimensions and material, the top of the lubricator being preferably provided at one corner with a filling opening having a suitable cap 2, and having in one corner, a gage glass 3, whereby the level of oil or other lubricant in the casing 1 can be readily observed. Passing through a stuffing box 4 in one side of the casing 1, near the bottom of the same, is the driving shaft 5, which is provided with a pulley or sheave 6 having a grooved periphery for the reception of a driving belt, or otherwise constructed for the application of power thereto from some rotating portion of the machine in connection with which the lubricator is used.

That portion of the shaft 5 which is inside of the casing 1 is provided with a worm 7 which is in mesh with a worm wheel 9, secured to or forming part of a rotating valve 10, the latter being secured to a central vertical shaft 11, which is adapted, at its lower end, to a bearing 12 on the bottom of the casing and at its upper end to a bearing 13 in a cap 14, the latter being secured to the top of the casing and serving to close an opening of relatively large size or diameter therein.

Depending from the cap 14 is an annular shell or casing 15, to the lower portion of which are secured a number of pump barrels 16, as many of these being employed as the capacity of the lubricator or the number of different bearings or other members of the machine to be lubricated may suggest.

The pump barrels are secured to or form part of a projecting base flange 17, and each pump barrel is in communication with a delivery nozzle 19 on the cap 14 through a pipe 20, which is adapted at its upper end to a stuffing box 21 on the cap, as shown in Fig. 1, each of the nozzles 19 having pipe connection with a member of the machine in connection with which it is employed.

The base 17 of the pump barrel structure is snugly fitted to the upper face of the rotating valve 10, said face being preferably recessed for the reception of the base 17 in order to provide a flange 22 whereby the valve is steadied in its rotative movement independently of the shaft 11, and in the upper face of said valve are formed two ports 23 and 24, the port 23 communicating, at its lower end, with a suction tube 25 leading to the bottom of the casing 1 and said port being, at its upper end, in line with the opening at the bottom of each pump barrel, whereby, as the valve 10 is rotated, each of said pump barrels will be placed in communication successively with the supply of lubricant contained in the casing 1.

The port 24 serves to connect each pump barrel with its respective delivery pipe 20 when the valve is in such position that said port registers with the pump barrel and pipe, as shown in Fig. 2, the circumferential extent of the port 23 and of each end of the port 24 being sufficient to provide for the proper charging of each pump barrel when the same is in communication with the suction pipe 25 and for the proper discharge of the contents of the pump when the latter is in communication with the outlet pipe.

The various pump barrels are secured to or form part of an internal annular flange 26, and upon the top of the latter is supported, so as to be free to turn, a disk 27 which has a spline and groove connection with the shaft 11, so that it is caused to rotate therewith, the vertical support of the disk, however, being provided by the upper edge of the flange 26, whereby said disk exercises only a torsional strain upon the shaft 11, all side strains upon the latter due to downward pressure upon the peripheral portion of the disk being prevented.

The disk 27 is maintained constantly in contact with the upper edge of the flange 26 by means of a coiled spring 29 interposed between said disk and a collar 30 adapted to a threaded portion of the shaft 11 and adjustable thereon, if desired, in order to vary the tension of the spring 29.

The plunger 31 of each pump has a projecting pin or anti-friction roller 32, and the latter are acted upon, in succession, by means of a lifting cam 33, formed upon or secured to the upper face of the disk 27, adjacent to the periphery of the same, whereby, as the disk 27 is rotated, the pump plungers 31 will be raised in succession thereby, the parts being so disposed that said lifting movement is imparted to each pump plunger, when its respective pump barrel is in communication, through the port 23 of the valve 10, with the section pipe 25 carried thereby, the pumps in succession therefore receiving a charge of lubricant from the reservoir contained within the casing 1. Before each pump plunger is permitted to descend, by reason of the withdrawal of the cam 33 from beneath its roller 32, the valve port 23 has passed beyond the outlet of the pump barrel, and the plunger is therefore supported upon the mass of lubricant contained in said barrel, while the latter is brought into communication with its outlet pipe 20, through the medium of the valve port 24.

Each of the pump plungers is cut away upon the inner side, for the reception of the cam-carrying peripheral portion of the disk 27, in order that the cam may act upon the plunger as closely as possible to the axial line of the latter, and thereby avoid that side thrust upon the plunger which results when the cam acts upon the latter at a point more remote from its axis. The depression of each pump plunger, in order to effect the discharge of the lubricant from its respective pump barrel through the valve port 24 and discharge pipe 20, is effected by means of a coiled spring 34 interposed between the upper end of the plunger and a screw plug 35 closing an opening in the cap 14, said spring surrounding a reduced stem 36 on the plunger, which stem passes through the plug 35 and has secured to its projecting portion a cap or collar 37, the descent of each plunger being restricted by a contact of said collar 37 with the upper face of the enlarged head 39 of the plug 35, as shown in Fig. 1. By vertical adjustment of the plug 35 in respect to the cap 14, therefore, the downward movement of any pump plunger can be regulated to a nicety, and the amount of lubricant discharged from each pump barrel on each reciprocation of the plunger therein can thereby be governed to accord with the requirements of the bearing or other member of the machine in connection with which that particular pump is used, an amount of lubricant sufficient for the specific requirements of each member being thereby supplied without the waste which would follow delivery of a surplus of lubricant to any member and which would result if each pump plunger had the same length of stroke, as such length of stroke would have to be sufficient to supply the maximum amount of lubricant required by any of the members of the machine. The enlarged head 39 of each of the plugs 35 is, by preference, notched as shown in Fig. 3 for the reception of a retaining pawl or detent 40 pivotally mounted in a recessed portion of the cap 14, and normally projected by means of a coiled spring 41, so as to prevent accidental displacement of either plug after the same has been properly adjusted.

By reason of the fact that the positive movement imparted to the pump plungers by means of the cam disk is a lifting movement and the descent of each plunger is controlled by the spring 34, there can be no breakage or other injury to the moving parts of the device in the event of the descent of the plungers being prevented by an obstruction in any of the delivery pipes or passages, and in this respect my invention is an improvement upon that type of lubricator in which the descending or discharge movement of the pump plunger is a positive one due to the action of the cam disk and its ascending or suction movement is effected by a spring.

If a relatively slow or gradual discharge of the lubricant from each pump barrel is desired, the cam 33 is constructed as shown in Figs. 4 and 5, with an incline or bevel at each end, but if a forcible projection of the lubricant from each pump barrel is advisable the cam may have a beveled approach and an abrupt delivery end, as shown at 33ª in Fig. 6. In the latter case the driving pulley 6 should be capable of turning the shaft 5 in but one direction, in order to prevent contact of the abrupt face of the cam with the pins or anti-friction rollers 32 on the pump plungers. One construction whereby this result may be attained is illustrated in Fig. 8, on reference to which it will be observed that the hub of the wheel is provided with a tubular projection 42 containing a sliding plug 43 normally projected by means of a spring 44, and having, at its forward end, a tooth with one abrupt face and one beveled face, the shaft 5 carrying a sleeve 45 which has in it a notch likewise having one abrupt face and one beveled face corresponding to the like faces of the tooth on the plunger 43, whereby the pulley will impart rotation to the shaft 5 only in the direction of the arrow, Fig. 8, that is to say, when the abrupt faces of the tooth and notch are in contact with one another, movement in the opposite direction simply forcing the tooth out of engagement with the notch and permitting the pulley to rotate freely on the sleeve 45.

By the use of a single valve controlling all of the pumps the expense and inconvenience of using a special valve or valves in connection with each pump is avoided, and by mounting the entire pump structure upon the cap 14 the same can be readily removed for inspection, cleaning or repair of any of the parts and as readily replaced after such inspection, cleaning or repair has been completed.

I claim:—

1. The combination, in a lubricator, of a reservoir for lubricant, a structure containing a series of pump barrels, each having a plunger therein, a cam disk for actuating said plungers in succession, said cam disk having its bearing upon the pump barrel structure, a driving shaft for said cam disk on which shaft said disk can move longitudinally, and a valve carried by said shaft and common to all of the pumps and serving to place them successively in connection first with the reservoir and then with an outlet pipe or passage.

2. The combination, in a lubricator, of a reservoir for lubricant, a structure containing a series of pump barrels, each having a plunger therein, a cam disk for actuating said plungers in succession, said cam disk having its bearing upon the pump barrel structure, a driving shaft for said cam disk on which shaft said disk can move longitudinally, yielding means for maintaining the cam disk in contact with its bearing on the pump barrel structure and a valve carried by said shaft and common to all of the pumps, and serving to place them successively in communication first with the reservoir and then with an outlet pipe or passage.

3. The combination, in a lubricator, of a reservoir for the lubricant, a series of pump barrels, each with plunger therein, means for imparting a positive retracting stroke to each plunger, yielding means for imparting the ejecting stroke to each plunger, and means for varying the length of said ejecting stroke, said means having, as elements, an adjustable plug through which the stem of the plunger passes and a cap or collar on said stem for contact with said plug.

4. The combination, in a lubricator, of a reservoir for the lubricant, a series of pump barrels, each with plunger therein, means for imparting a positive retracting stroke to each plunger, yielding means for imparting the ejecting stroke to each plunger, and means for varying the length of said ejecting stroke, said means having, as elements, an adjustable plug with notched head, and yielding detents for engaging said notched head and preventing displacement of the plug after its adjustment.

5. The combination, in a lubricator, of a casing containing a reservoir for the lubricant, a central shaft adapted to bearings in said casing, a pump structure comprising a plurality of pumps rigidly mounted in said casing around said shaft, a valve secured to said shaft and serving to connect each of the pumps in succession with an inlet and an outlet for the lubricant, and a cam disk also carried by said central shaft and acting upon the plungers of the pumps.

6. The combination, in a lubricator, of a casing containing a reservoir for the lubricant, a central shaft adapted to bearings in said casing, a pump structure comprising a plurality of pumps rigidly mounted in said casing around said shaft, a valve secured to said shaft and serving to connect each of the pumps in succession with an inlet and an outlet for the lubricant, and a cam disk also carried by said central shaft and acting upon the plungers of the pumps, said cam disk having its bearing upon the pump structure and having connection with the shaft whereby it can be rotated.

In testimony whereof, I have signed my name to this specification, in the presence of two subscribing witnesses.

GEORGE W. NÜTZ.

Witnesses:
 EDWIN B. PEET,
 AUGUST J. H. STEFFENS.